(12) United States Patent
Baughman et al.

(10) Patent No.: US 10,900,702 B2
(45) Date of Patent: Jan. 26, 2021

(54) AUTOMATED STORAGE WAREHOUSE

(71) Applicant: International Business Machines Corporation, Armonk, NY (US)

(72) Inventors: Aaron K. Baughman, Silver Spring, MD (US); Barry M. Graham, Silver Spring, MD (US); Alexandra Urman, New York, NY (US); Christopher J. Dawson, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/003,159

(22) Filed: Jun. 8, 2018

(65) Prior Publication Data
US 2019/0376735 A1    Dec. 12, 2019

(51) Int. Cl.
*B63G 8/00* (2006.01)
*B64C 39/02* (2006.01)
(Continued)

(52) U.S. Cl.
CPC ............... *F25D 1/00* (2013.01); *B63G 8/001* (2013.01); *B64C 39/024* (2013.01); *F25D 1/02* (2013.01); *F25D 29/003* (2013.01); *G05D 1/042* (2013.01); *G05D 1/048* (2013.01); *B63G 2008/004* (2013.01); *B64C 2201/022* (2013.01); *B64C 2201/101* (2013.01); *B64C 2201/128* (2013.01);
(Continued)

(58) Field of Classification Search
CPC ......... B63G 8/001; B64C 39/024; F25D 1/02; F25D 29/003; G05D 1/042; G05D 1/048
USPC .......................................................... 701/10
See application file for complete search history.

(56) References Cited

U.S. PATENT DOCUMENTS 7,231,876 B2    6/2007 Kellner
8,938,311 B2    1/2015 Flohr
(Continued)

FOREIGN PATENT DOCUMENTS

WO    2017201235 A1    11/2017

OTHER PUBLICATIONS

Li et al., "Attitude Tracking Control of a GroundGen Airborne Wind Energy System", 2016 American Control Conference (ACC), Boston Marriott Copley Place, Jul. 6-8, 2016, 6 pages.
(Continued)

*Primary Examiner* — Yazan A Soofi
(74) *Attorney, Agent, or Firm* — Peter J. Edwards (57) ABSTRACT

A product may be stored in a protective container that is surrounded with a fluid. A heat-sensitivity rating for the product may be obtained, and a product energy for the product may be calculated. The calculating may include adjusting the longest dimension of the product based on the heat-sensitivity rating and defining a sphere of enthalpy around the product. The sphere's radius may be equal to the adjusted product dimension and the sphere may be centered at the product center. The calculating may also comprise multiplying the volume of the sphere by the air pressure inside the protective container. An environmental condition within the sphere during a first time period may be forecasted. It may be determined that the product is likely to deteriorate during the first time period based on the product energy and heat-sensitivity rating. The altitude of the protective container may be altered to mitigate this deterioration.

13 Claims, 7 Drawing Sheets

(51) Int. Cl.
  *F25D 1/02* (2006.01)
  *F25D 29/00* (2006.01)
  *G05D 1/04* (2006.01)
  *F25D 1/00* (2006.01)

(52) U.S. Cl.
  CPC .... *B64C 2201/167* (2013.01); *F25D 2700/06* (2013.01); *F25D 2700/12* (2013.01)

(56) References Cited

U.S. PATENT DOCUMENTS

| | | | |
|---|---|---|---|
| 8,959,036 | B2 | 2/2015 | Huat |
| 9,305,280 | B1* | 4/2016 | Berg ................... H04L 67/12 |
| 9,758,302 | B1* | 9/2017 | Brazeau ................. B65G 1/06 |
| 2014/0361122 | A1 | 12/2014 | Ruiterkamp |
| 2015/0039529 | A1 | 2/2015 | Barakat |
| 2015/0266574 | A1 | 9/2015 | Ruiterkamp |
| 2016/0376887 | A1* | 12/2016 | Hayatdavoudi ......... E21B 43/00 703/10 |
| 2016/0381835 | A1* | 12/2016 | Cutler ................... A01K 29/005 361/679.46 |
| 2017/0077759 | A1* | 3/2017 | Niizuma ................. B63G 8/001 |
| 2017/0336125 | A1* | 11/2017 | Winkle ................. F25D 29/003 |
| 2018/0099732 | A1* | 4/2018 | Tillotson .................. F17C 5/00 |
| 2019/0252592 | A1* | 8/2019 | Hiller ..................... B63G 8/22 |

OTHER PUBLICATIONS

Zgraggen et al., "Automatic Retraction and Full-Cycle Operation for a Class of Airborne Wind Energy Generators", IEEE Transactions on Control Systems Technology, vol. 24, No. 2, Mar. 2016, pp. 594-608.

Moreno et al., "Customer-aware resource overallocation to improve energy efficiency in realtime Cloud Computing data centers", IEEE International Conference on Service-Oriented Computing and Applications (SOCA), Dec. 12-14, 2011, 8 pages.

Eichelberger et al., "IVML: a DSL for configuration in variability-rich software ecosystems", Proceedings of the 19th International Conference on Software Product Line, Jul. 20-24, 2015, pp. 365-369.

Light et al., "Design for Existential Crisis in the Anthropocene Age", Proceedings of the 8th International Conference on Communities and Technologies, Jun. 26-30, 2017, pp. 270-279.

Antal et al., "DC Thermal Energy Flexibility Model for Waste Heat Reuse in Nearby Neighborhoods", Proceedings of the Eighth International Conference on Future Energy Systems, May 16-19, 2017, pp. 278-283.

* cited by examiner

AUTOMATED STORAGE WAREHOUSE

BACKGROUND

Aspects of the present disclosure relate to storage of sensitive goods, more particular aspects relate to predicting and mitigating deterioration of sensitive goods.

Typical solutions for storing sensitive goods utilize expensive environmental-control mechanisms to maintain an environment that mitigates deterioration of sensitive goods. The ability to detect potential deterioration of particular goods in these typical solutions is limited.

SUMMARY

Some embodiments of the present disclosure can be illustrated by a method comprising storing a product in a protective container. This protective container may be surrounded with a fluid. The method may further comprise obtaining a heat-sensitivity rating for the product and calculating a product energy for the product. This calculating may comprise identifying the longest dimension of the product and adjusting the longest dimension based on the heat-sensitivity rating for the product. The calculating may also comprise defining a sphere of enthalpy around the product. The sphere of enthalpy may have a radius equal to the adjusted product dimension and may be centered at the center of the product. The calculating may also comprise calculating the volume of this sphere of enthalpy, and then multiplying that volume by the air pressure inside the protective container. The method may also include forecasting an environmental condition within the sphere of enthalpy during a first time period. The method may also comprise determining, based on the product energy and the heat-sensitivity rating, that the product is likely to deteriorate during the first time period due to that forecasted environmental condition. The method may also comprise altering the altitude of the protective container to mitigate the deterioration due to the forecasted air temperature.

Some embodiments of the present disclosure can be illustrated by an automated warehouse. The automated warehouse may comprise a first product-monitoring system configured to obtain a heat-sensitivity rating for a product and assign a tolerance condition to the product based on the heat-sensitivity rating. The automated warehouse may also comprise a lift mechanism configured to adjust the altitude of the warehouse to comply with the tolerance condition. The automated warehouse may also comprise a first sensor configured to detect deterioration of the product, and a second sensor configured to determine, based on the detected deterioration, that a current condition of the warehouse complies with the tolerance condition. The product-monitoring system may be further configured to adjust the heat-sensitivity rating for the product based on detecting the deterioration and based on the determination that the current condition complies with the tolerance condition.

Some embodiments of the present disclosure can be illustrated by an automated submarine warehouse that comprises a flexible hull. The automated submarine warehouse may also comprise a stored product, and a product sensor configured to detect deterioration of the stored product and to determine, based on the type of deterioration detected, the likely cause of the detected deterioration. The automated submarine warehouse may also comprise a pressure tank configured to increase the air pressure of the submarine warehouse in response to the product sensor determining that the likely cause is a temperature below a tolerance condition for the product measured. Finally, the automated warehouse may also comprise a ballast mechanism configured to cause the warehouse to descend to a first depth at which the water pressure equals the increased air pressure of the submarine warehouse.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to storage of sensitive goods, more particular aspects relate to predicting and mitigating deterioration of sensitive goods. While the present disclosure is not necessarily limited to such applications, various aspects of the disclosure may be appreciated through a discussion of various examples using this context.

Internet shopping has become a large portion of a typical consumer's shopping habits. In spite of this, perishable goods and goods that have sensitive storage conditions (e.g., temperature ranges) have traditionally still been purchased in-person from physical retailers due to the complications and expense of storing and shipping such goods (herein referred to as "sensitive goods"). However, consumer demand for full-service online shopping, including sensitive goods, continues to increase. Unfortunately, traditional storage solutions that support Internet shopping demand typically involve large storage warehouses from which goods are shipped throughout a country, region, or world. Such solutions often are impractical for sensitive goods, as sensitive goods oftentimes must be delivered quickly to limit the amount of time they are outside those sensitive conditions for storage. Further, the expense and complications associated with maintaining those sensitive conditions at large storage warehouses can be prohibitive.

It may be possible to mitigate some of the above issues by utilizing smaller, automated warehouses with smaller shipping ranges, such as airborne warehouses located near densely populated areas. While automated airborne warehouses may enable Internet retailers to reduce shipment times, maintaining sensitive conditions in such airborne warehouses may still be very costly and complicated. This presents a need for a feasible solution to maintaining sensitive conditions in these automated warehouses.

Regardless of where sensitive goods are stored, it may be beneficial to monitor the condition of goods to detect potential deterioration of the goods. Deterioration of a good may include any adverse effects on a good (e.g., spoilage, premature ripening, dehydration, cessation of bacterial culture growth, failed incubation) resulting from storage outside the ideal storage conditions for that good. Deterioration for a particular good may occur, for example, when the conditions in which that good is stored do not correspond to ideal storage conditions for that good. This may be likely, for example, when the temperature at which a manufacturer recommends storing a good (e.g., an uncooked chicken) does not align with the needs of that particular good. In some instances, this may be due to an incorrectly recommended temperature. In other instances, it may be due to a temperature being recommended for a class of goods that have similar, but not the same, storage-condition requirements as the other goods in the class.

Traditionally, potential deterioration of sensitive goods could be detected by human monitors at the physical locations at which those goods were stored and sold. However, recent trends in the demand for the capability to buy sensitive goods from Internet vendors has created a need for larger volumes of sensitive goods to be stored in a condition that is ready for delivery. This may lead to infeasibilities in detecting potential deterioration with human monitors. In some instances, for example, the volumes of sensitive goods are too large to be effectively monitored by a staff of human monitors. Further, in some instances it may be infeasible for human monitors to attend to locations in which goods are stored (e.g., in automated warehouses). Unfortunately, automated systems for monitoring and responding to deterioration are limited.

Some embodiments of the present disclosure present improved systems for automatically maintaining proper storage conditions for sensitive goods. Some embodiments, for example, define an enthalpy sphere surrounding each particular good (e.g., each individual flower or perishable food item) being monitored. This enthalpy sphere may be defined, for each individual good, based on the dimensions of that individual good and a heat-sensitivity rating of the good. The storage conditions within each sphere may be monitored automatically by the system for signs of potential degradation (e.g., wilting) or improper storage conditions (e.g., temperature outside a recommended range). Some embodiments of the present disclosure may also calculate a product energy based on the enthalpy sphere and the current conditions inside the enthalpy sphere (e.g., the temperatures of the air and objects inside the sphere). This product energy may, in some embodiments, be indicative of the total energy within the enthalpy sphere (e.g., the energy of the air and objects within the sphere), and may, in some other embodiments, be indicative of the total energy of the air within the enthalpy sphere. This product energy may then be used to forecast the effect within the sphere of a change in the conditions outside the sphere. For example, the product energy may be used to forecast whether an environmental change in temperature or pressure will cause the conditions within the enthalpy sphere to drift outside a range of acceptable conditions for the particular good inside the sphere.

Some embodiments of the present disclosure may also include mitigating potential deterioration by moving a particular good for which potential deterioration is predicted to an environment in which potential deterioration is not predicted. For example, a warehouse monitoring system detects that a particular good is likely to deteriorate may select that good to be relocated to a new environment with conditions that are within the tolerance conditions for the particular good. In some embodiments, this may include relocating the particular good to another warehouse (e.g., a warehouse in the new environment). In some other embodiments, this may include or relocating the warehouse to that new environment. In some embodiments the new environment may be an environment with a different temperature than the original environment, such as an environment at a higher altitude. In other embodiments, the new environment may be an environment with a different pressure than the original environment, such as an environment that is deeper under water.

Some embodiments of the present disclosure may develop or update a heat sensitivity rating for a particular product and use that developed or updated heat-sensitivity rating, for example, when defining an enthalpy sphere for the product and the tolerance conditions for the product. For example, a warehouse may automatically develop a heat-sensitivity rating based on the known properties of a product when that product is delivered to the warehouse. The conditions in which the product is to be stored (i.e., the target conditions of the enthalpy sphere, also referred to as the tolerance conditions for the product) may be determined based off that heat-sensitivity rating. If the warehouse monitoring system detects product deterioration in the presence of those conditions, however, the system may update the heat-sensitivity rating of the product as a result.

Figure 1:
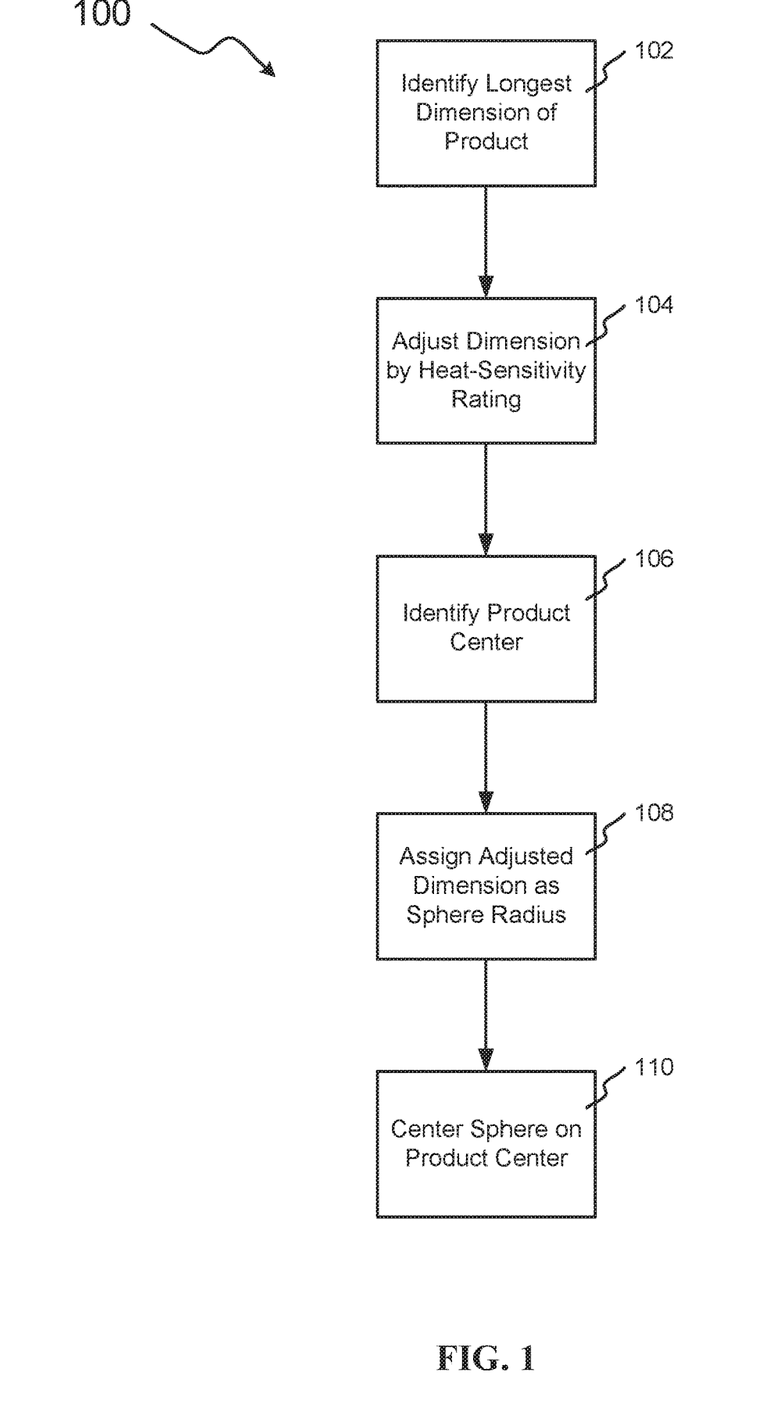
FIG. 1 illustrates a method of defining an enthalpy sphere for a particular product, in accordance with embodiments.

FIG. 1 illustrates a method 100 of defining an enthalpy sphere for a particular product, in accordance with embodiments. In block 102, the longest dimension of a product is identified. For example, if the product were an intact chicken carcass (e.g., to be used for dissection purposes), the distance from the chicken's feet to the chicken's beak may be larger than the distance between any other two points on the chicken in the position in which the chicken is being stored, and thus the dimension spanning the chicken's feet and beak (e.g., the chicken's height, if it were stored in a standing position, or the chicken's length, if it were stored lying down) would be used.

In block 104, the longest dimension of the product is altered by the product's heat-sensitivity rating. In some embodiments the heat-sensitivity rating may be a number that is larger than zero and less than or equal to one. The heat-sensitivity rating may be a numerical expression of the sensitivity of the product to various temperature conditions. For example, the product's sensitivity to temperatures above or below the recommended storage temperature (e.g., how quickly the product is likely to deteriorate if exposed to temperatures outside a recommended range). Some products, for instance, may be able to withstand large deviations (e.g., 30 Celsius degrees) outside a given temperature range as long as they are not for extended periods of time (e.g., less than 10 seconds). Those products, however, may be unable to withstand much smaller deviations (e.g., 1 Celsius degree) outside that temperature range if those deviations are above a certain amount of time (e.g., 45 seconds). These tolerances may be expressed by the heat-sensitivity rating.

In some embodiments the heat-sensitivity rating used in block 104 may be obtained from the source of the particular product. For example, if the particular product is a flower, the florist from which the flower is sourced may calculate and provide the heat-sensitivity rating. In other embodiments the heat-sensitivity rating may be calculated for the product based on known properties of the product (e.g., recommended temperature range for storage, size of product, product category). In some embodiments the heat sensitivity rating used in block 104 may be an updated heat-sensitivity rating. For example, a particular product's heat-sensitivity rating may be adjusted if that product is stored in storage conditions based on the heat-sensitivity rating, but the product deteriorates in those storage conditions.

In some embodiments, adjusting the longest product dimension in block 104 may cause the adjusted product dimension to be larger or smaller than the original dimension. For example, in some embodiments the adjustment may involve dividing or multiplying the longest product dimension by the heat-sensitivity rating. In instances in which the heat-sensitivity rating is less than 1.0, dividing the longest dimension by the heat-sensitivity rating would cause the adjusted product dimension to be larger than the original longest product dimension. Multiplying the longest product dimension by this same heat-sensitivity rating, however, would cause the adjusted product dimension to be shorter.

After the adjusted product dimension is calculated, the product center is identified in block 106. This product center may be identified in several ways, depending on the embodiment. In some embodiments the center of the identified longest dimension may be used. For example, if the longest dimension of a Christmas goose is from the end of the drumstick to the tip of the neck, the midpoint between the end of the drumstick and tip of the neck may be identified as the product center. In other embodiments, the product's center of mass may be used as the product's center. For example, if the product were an Easter ham, the center of mass of the ham (e.g., near the broad end of the ham) may be used as the product center.

In block 108, the adjusted dimension calculated in 104 is assigned as the radius of the enthalpy sphere. This enthalpy sphere is superimposed over the product in block 110, such that the center of the enthalpy sphere is located at the center of the product that was identified in block 106.

In some embodiments, an enthalpy sphere, such as the enthalpy sphere defined by method 100, may be used to calculate the product energy of a particular product. The product energy of a product may be an expression of the energy of at least a portion of the environment within the enthalpy sphere that surrounds that product. For example, in some embodiments the product energy may be found by multiplying the air pressure inside the enthalpy sphere by the volume of air inside the enthalpy sphere, resulting in the energy of the air inside the sphere. This energy may be expressed as a number of joules, for example. In some embodiments product energy may also include some energy attributed to the product itself, such as the heat of the product (e.g., the temperature of the product multiplied by the amount of joules released by the product per drop in unit temperature). In other embodiments, only the energy of the air inside the sphere may be calculated.

Figure 2:
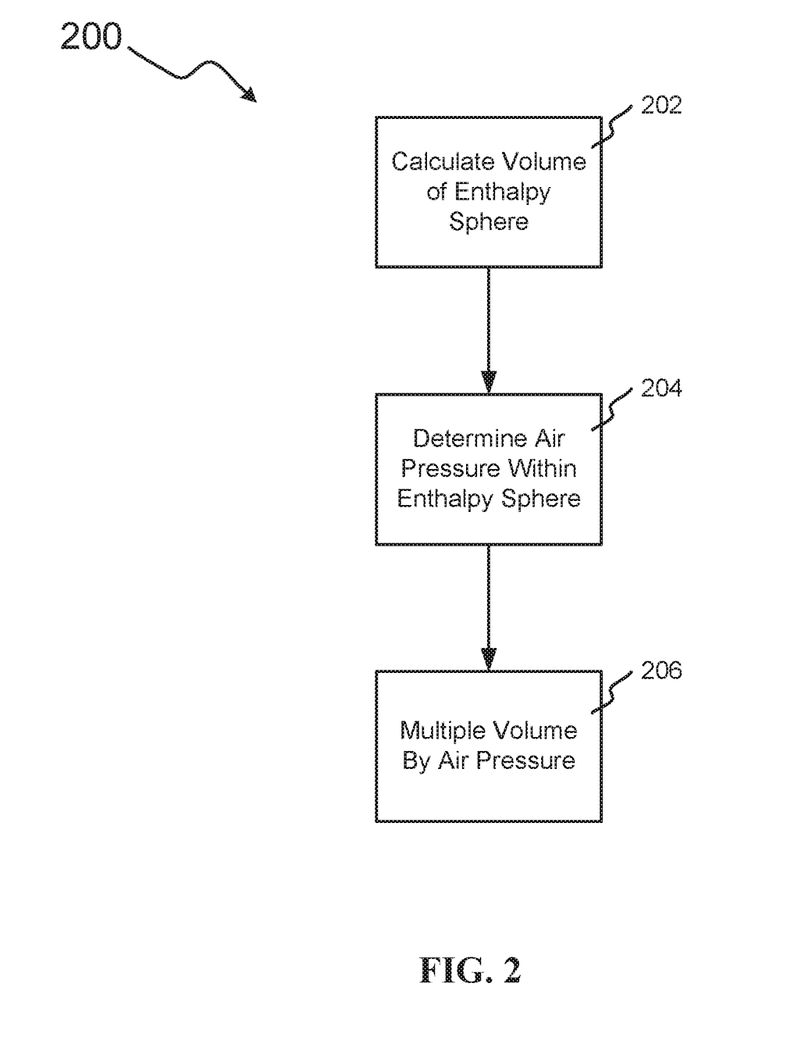
FIG. 2 illustrates a method of calculating the product energy of a product in a sphere of enthalpy, in accordance with embodiments.

FIG. 2 illustrates a method 200 of calculating the product energy of a product in a sphere of enthalpy, according to some embodiments. In block 202, the volume of an enthalpy sphere is calculated. This enthalpy sphere may be defined by any method consistent with the embodiments of this disclosure, such as method 100. In block 204, the air pressure inside the enthalpy sphere is determined. In some embodiments this air pressure may be obtained by an instrument within the enthalpy sphere, such as a barometer placed near a product within the enthalpy sphere. In other embodiments the air pressure of the environment surrounding the enthalpy sphere may be obtained and attributed to the enthalpy sphere. For example, one or more barometers may be placed throughout a warehouse in which an enthalpy sphere is located. The barometer that is located closest to the center of the enthalpy sphere may be used to determine the air pressure at that point in the warehouse, which may then be attributed to the enthalpy sphere.

After the volume and air pressure of the enthalpy sphere are obtained in blocks 202 and 204 respectively, the volume is multiplied by the air pressure, resulting in the energy of the air within the enthalpy sphere. In some embodiments, this energy may be used as the product energy. In some other embodiments, the energy of the product itself (such as the heat energy) may also be calculated and added to the energy of the air.

In some embodiments of the present disclosure, products may be stored in automated warehouses that are located near populated areas. For example, these automated warehouses may be designed to fly in the atmosphere near a highly populated area or may be submerged in the ocean or large lake near a coastal city. These warehouses may be equipped with product-monitoring systems that are configured to establish enthalpy spheres and product energies for the products within the warehouses. These product energies may be used by the product-monitoring systems to establish tolerance conditions, such as temperature ranges within which the products are rated to be stored without a significant likelihood of product deterioration. The warehouses may also be equipped with environmental monitoring systems, which may be equipped to monitor the environmental conditions of the warehouse environment (e.g., the temperature of the warehouse as a whole).

Figure 3:
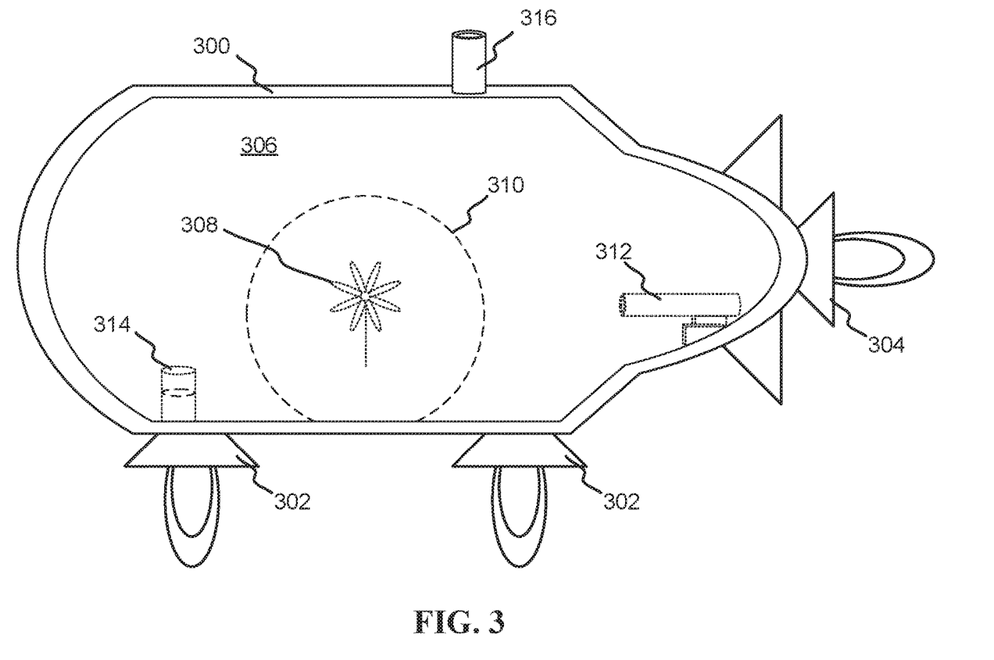
FIG. 3 illustrates an example illustration of an airborne automated warehouse in accordance with embodiments.

FIG. 3 illustrates an example illustration of an airborne automated warehouse 300 consistent with the embodiments of the present disclosure. Warehouse 300 is depicted as containing lift mechanisms 302 and propulsion mechanism 304. Lift mechanisms 302 may be utilized by the warehouse 300 to ascend, hold altitude, or slow descent in the atmosphere, whereas propulsion mechanism 304 may be utilized by warehouse 300 to move laterally. While lift mechanisms 302 and propulsion mechanisms 304 are depicted herein as exothermic-reaction thrusters, lift mechanisms 302 and propulsion mechanisms 304 may, in some embodiments, take other forms. For example, lift mechanisms 302 may take the form of wings, rotors, or tanks of lighter-than-air gas (e.g., hydrogen or helium). Propulsion mechanism 304, on the other hand, may take the form of a propeller, compressed-air canisters, or an ion-drive mechanism. Further, while two lift mechanisms 302 and one propulsion mechanism 304 is illustrated on warehouse 300, in some embodiments different numbers of either or both of lift mechanisms 302 and propulsion mechanism 304 may be present.

FIG. 3 depicts warehouse 300 with the outer wall partially removed, making the inner wall 306 of the warehouse visible. Product 308 is depicted within warehouse 300, and is illustrated herein as a flower. The identified center of product 308 is located at the center of enthalpy sphere 310. Enthalpy sphere 310 may be defined according to any method consistent with the embodiments of this disclosure. Warehouse 300 may contain one or more sensor 312. Sensor 312 may be part of one or both of a product-monitoring system and an environmental-monitoring system. For example, in some embodiments sensor 312 may take the form of a thermometer (e.g., an infra-red camera or a laser thermometer) that is configured to monitor the temperature of product 308 or of the air within enthalpy sphere 310. Sensor 312 may also take the form of an optical camera (e.g., a digital video camera or a digital picture camera) designed to monitor product 308 for signs of deterioration. While, in this illustration, warehouse 300 is depicted with one sensor 312, in some embodiments multiple sensors 312 may be present. In some such embodiments each product 308 may be monitored by one or more sensor 312 (e.g., by one sensor 312 that records the temperature of the product, and another sensor 312 that records images of the product to detect deterioration. In some embodiments sensor 312 may also be configured to monitor the temperature of the environment within warehouse 300 or to monitor the temperature of the environment surrounding warehouse 300.

In some embodiments, warehouse 300 may also contain barometer 314. Barometer 314 may be utilized by the environmental-monitoring system to monitor the air pressure within warehouse 300. This air pressure may be used, for example, in determining a product energy of product 308. In some embodiments more than one barometer 314 may be present. For example, in some embodiments barometer 314 may be located next to product 308 within enthalpy sphere 310.

Warehouse 300 may also contain air filtration mechanism 316. Air filtration mechanism 316 may allow the transfer of air between the inside of warehouse 300 and the environment outside warehouse 300. In some embodiments this transfer of air may be active, such as by powered fans, or passive. By allowing air exchange between warehouse 300 and the outside environment, the air temperatures between warehouse 300 and the surrounding environment may equalize. This equalization of temperatures, then may enable the warehouse 300 to utilize the temperature of the surrounding environment to control the temperature of the air inside the warehouse. For example, if sensor 312 determines that the air inside warehouse 300 is too high, or that product 300 is beginning to deteriorate, warehouse 300 may utilize lift mechanisms 302 to ascend to a higher altitude, where the air temperature may be lower. Air may then be exchanged through air filtration mechanism 316, cooling the air within warehouse 300.

Figure 4:
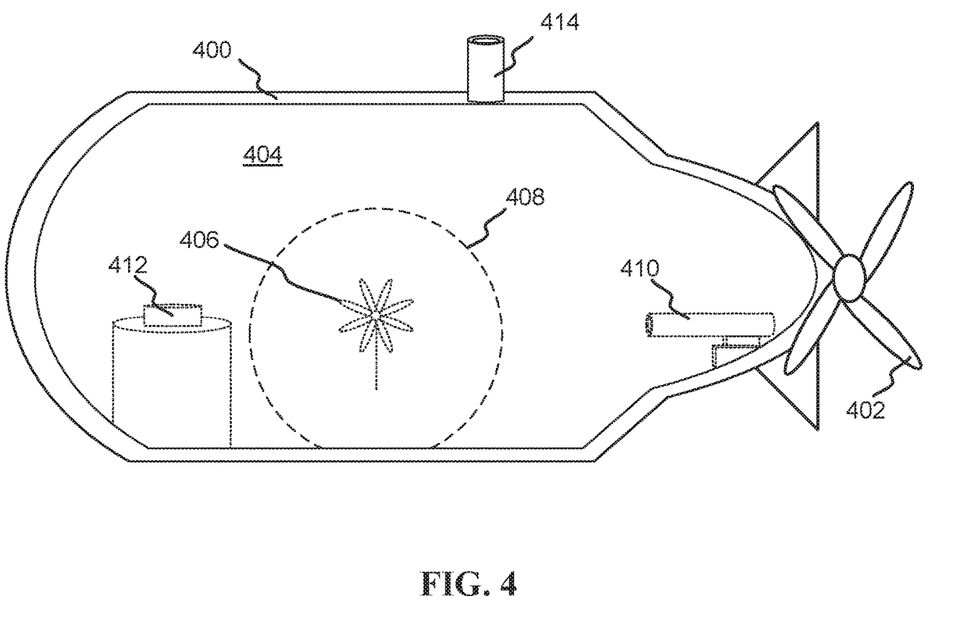
FIG. 4 depicts an example illustration of an automated warehouse that is designed to be submerged underwater, in accordance with embodiments.

FIG. 4 depicts an example illustration of an automated warehouse 400 that is designed to be submerged underwater, consistent with the embodiments of the present disclosure. Such a warehouse, for reasons discussed below, may be useful for storing goods that require high temperatures, such as bacterial cultures. Warehouse 400 features propulsion mechanism 402, which may be utilized to move warehouse 400 laterally. In FIG. 4 propulsion mechanism 402 is depicted as a propeller, but in other embodiments other propulsion mechanisms may be utilized. In some embodiments propulsion mechanism 402 may also be utilized to cause warehouse 400 to ascend and descend. In other embodiments, warehouse 400 may feature mechanisms such as ballasts and further propellers may be utilized to ascend and descend.

FIG. 4 depicts warehouse 400 with the outer wall partially removed, making the inner wall 404 of the warehouse visible. Product 406 is depicted within warehouse 400, and is illustrated herein as a flower. The identified center of product 406 is located at the center of enthalpy sphere 408. Enthalpy sphere 408 may be defined according to any method consistent with the embodiments of this disclosure. Warehouse 400 may contain one or more sensor 410. Sensor 410 may be any type of sensor consistent with the embodiments of this disclosure (e.g., a visual sensor, temperature sensor, or pressure sensor), and may be utilized to monitor product 406 or the environment within warehouse 400. In some embodiments multiple sensors 410 may be present. In some embodiments, warehouse 400 may also contain one or more sensors that are capable of measuring the temperature or pressure, or both, of the water surrounding warehouse 400.

In some embodiments, sensor 410 may be capable of detecting deterioration of product 406, and may further be capable to determine the likely cause of that deterioration based on the type of deterioration detected. For example, the product may be a chemical product and the detected deterioration may be that the product has begun reacting (e.g., two separate ingredients of a heterogeneous mixture may begin combining into a solution). In this instance, sensor 410 may determine that the deterioration is likely caused by the temperature of the environment being above a level at which that reaction would be suppressed. In another instance, the product may be a biological culture (e.g., a living bacterial colony on a growth medium), and the detected deterioration may be that the product has begun to die (e.g., the bacterial colony may shrink). In this instance, sensor 410 may determine that the deterioration is likely caused by the temperature of the environment being below a level at which that bacteria can survive. Warehouse 400 contains pressure tank 412, which may be capable of releasing air into the environment of warehouse 400. As pressure tank 412 releases air into the environment of warehouse 400, the air pressure in warehouse 400 increases, causing an added force on the inner walls of warehouse 400 (such as inner wall 404). If the air pressure inside warehouse 400 were increased sufficiently, the temperature of the air inside warehouse 400 could be increased to levels desired to within the tolerance levels of product 406.

If warehouse 400 featured a hard, inflexible hull, the hull would be capable of absorbing the added force associated with the increased air pressure within warehouse 400. However, in some embodiment a flexible hull may be preferred. A flexible hull, for example, may be significantly cheaper, reducing the cost of warehouse 400. However, if pressure tank 412 increases the air pressure inside warehouse 400, the flexible hull of warehouse 400 may deform and potentially rupture. If warehouse 400 descends to a water depth at which the water pressure on the outside of the flexible hull equals the increased air pressure on the inside of the flexible hull, the flexible hull would not deform. In this way, warehouse 400 is capable of manipulating the air pressure within warehouse 400 at the same time as manipulating the depth of warehouse 400 in order to raise the air temperature within warehouse 400 without causing the flexible hull to deform.

Warehouse 400 may also feature air valve 414, which may be opened to release air from the cavity of warehouse 400 into the surrounding water. When air valve 414 is opened and air is released, the air pressure within warehouse 400 may drop, causing the air temperature within warehouse 400 to decrease. At that point warehouse 400 may ascend within the water to equalize the surrounding water pressure with the air pressure.

Thus, sensor 410 determines that product 406 is deteriorating, or that the conditions inside warehouse 400 are such that product 406 is likely to deteriorate, warehouse 400 may either release compressed air from pressure tank 412 to increase the air pressure within warehouse 400 (and thus increase the temperature), or open air valve 414 to release the air from within warehouse 400 to the surrounding environment and decrease the air pressure within warehouse 400 (and thus decrease the temperature). In embodiments in which warehouse 400 features a flexible hull, warehouse 400 may also ascend and descend to equalize the water pressure and the air pressure as necessary.

Figure 5:
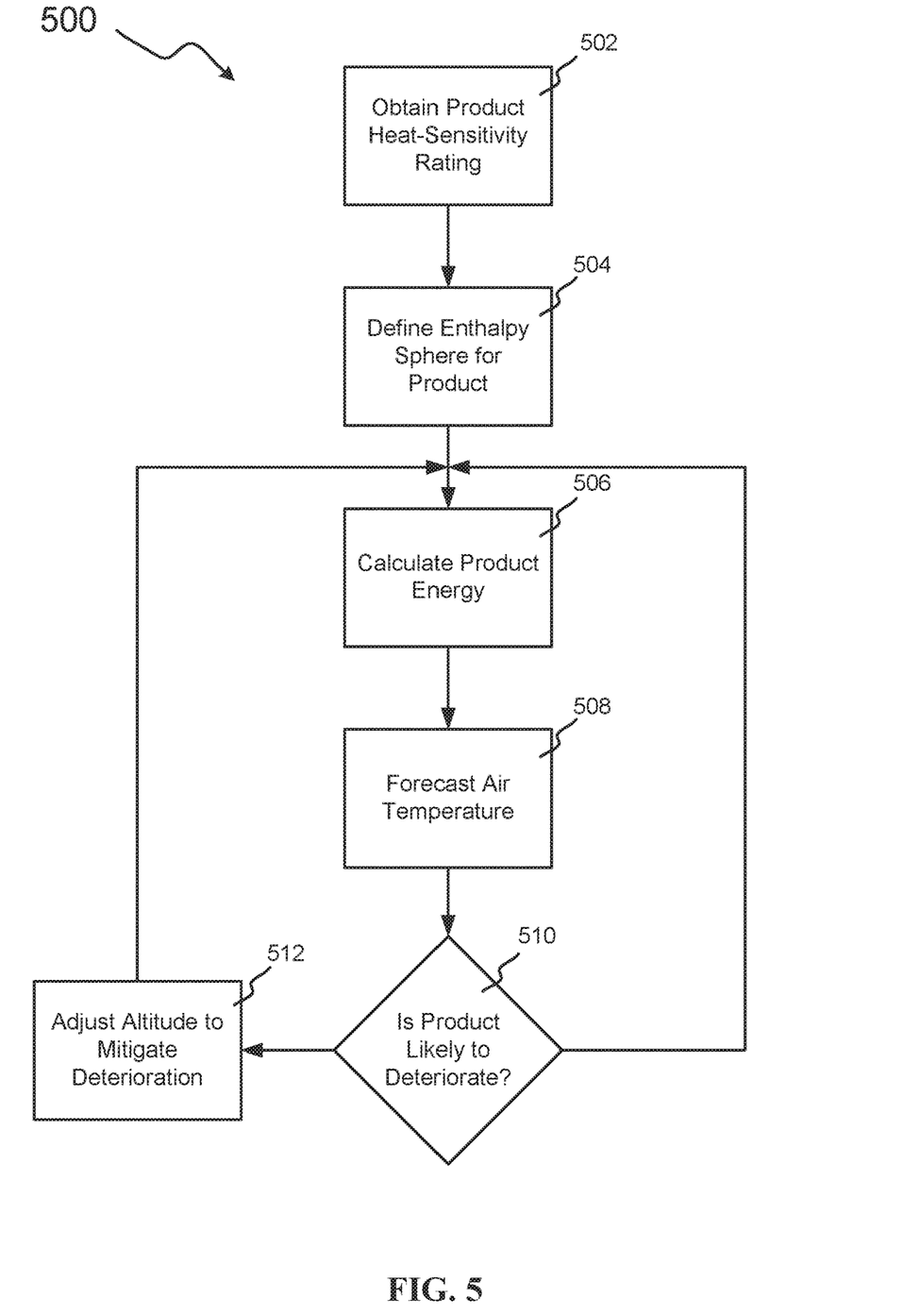
FIG. 5 illustrates an example method in which the altitude within a fluid of a warehouse may be controlled to alter the temperature within the warehouse, in accordance with embodiments.

FIG. 5 illustrates an example method 500 in which the altitude within a fluid (e.g., water or air) of a warehouse may be controlled to alter the temperature within the warehouse. Method 500 may be useful, for example, in an airborne warehouse (i.e., a warehouse suspended above ground in a fluid composed of air) that takes advantage of the cold temperatures at high altitudes to keep products at low temperatures. Method 500 may also be useful in a submarine warehouse (i.e., a warehouse suspended below sea level in a fluid composed of water) that takes advantage of high pressures to increase temperature within the warehouse and in turn to keep products at high temperatures.

In block 502, the heat-sensitivity rating of a product is obtained. The heat-sensitivity rating may be obtained by any method consistent with the embodiments of this disclosure. That heat-sensitivity rating may then be used to define an enthalpy sphere for the product, again by any method consistent with the embodiments of this disclosure. That enthalpy sphere may be defined such that it surrounds the product. In block 506 the product energy of the product is calculated based on the enthalpy sphere. For example, in some embodiments the volume of the enthalpy sphere may be multiplied by the air pressure within the enthalpy sphere. In other embodiments only the volume of air within the enthalpy sphere (i.e., the volume of the enthalpy sphere minus the volume of the product and any objects in the sphere that are not the particular product) may be calculated. Other methods of calculating the product energy that are consistent with the embodiments of the present disclosure may also be utilized.

In block 508, the air temperature within the enthalpy sphere for a future time period is forecasted. This forecast may be based, for example, on weather data associated with the environment surrounding the warehouse, the current temperature within the warehouse, and heat producing (or absorbing) objects within the warehouse (including the product itself). Once the air temperature is forecasted for the future time period, a product-monitoring system may determine in block 510 whether the product would be likely to deteriorate during that future time period at that forecasted temperature. In some embodiments this determination may involve simply comparing the forecasted temperature with a temperature range rated for the product. In other embodiments the determination may involve comparing a product's tolerance for changes in temperature (e.g., as part of a heat-sensitivity rating) with the magnitude of the forecasted temperature change, the duration of the forecasted temperature change, or both.

If the product is determined to be unlikely to deteriorate in block 510, the product energy is recalculated in block 506 after a set period of time. In some embodiments this set period of time may be zero or essentially zero, such that the product energy of the product is continually being recalculated. In other embodiments the period of time may depend on the forecasted air temperature. For example, if the air temperature were forecasted to change during the future period, the product energy may be recalculated after that forecasted change.

If, on the other hand, the product is determined to be likely to deteriorate in block 510, the altitude within the surrounding fluid of the warehouse containing the product may be adjusted in block 512 to mitigate that deterioration. The nature of that adjustment may depend in part on the properties of the warehouse in which the product is being stored, the type of fluid by which the warehouse is surrounded, and the type of mitigation detected. For example, if the warehouse is a submarine suspended below the water, the product being stored in the warehouse may require high temperature, and thus to mitigate deterioration of the product, the temperature of the warehouse may need to be increased. The warehouse may increase the temperature by increasing the air pressure inside the warehouse, such as by descending into high-pressure water, releasing air into the warehouse from a pressurized tank, or both. In this example, adjusting the altitude in block 512 may involve descending into deeper water.

After the altitude is adjusted in block 512, the product energy is again determined in block 506 in the new environmental conditions, and a product monitoring system proceeds to monitor the product based on that new product energy.

In some embodiments of the present disclosure a product's heat-sensitivity rating may be updated based upon detected product deterioration that is not predicted based on that product's current heat-sensitivity rating (e.g., the prediction discussed in method 400). This deterioration may be referred to as "unpredicted deterioration." In some such embodiments, unpredicted deterioration for a particular product in a particular class of products (e.g., a particular orchid in the class of orchids) may be used to update the heat-sensitivity rating of only that particular product, or for all products in that particular class. Further, updating the heat-sensitivity rating for all products in a class may be propagated throughout all warehouses storing that class of product, or may only be applied to the products within the warehouse storing the particular product. Further, in some embodiments, the heat-sensitivity ratings for higher-level classes in which a product falls (e.g., the higher-level class of "flower" for an orchid) may also be adjusted if the heat-sensitivity rating for any product within that higher-level class is adjusted.

Figure 6:
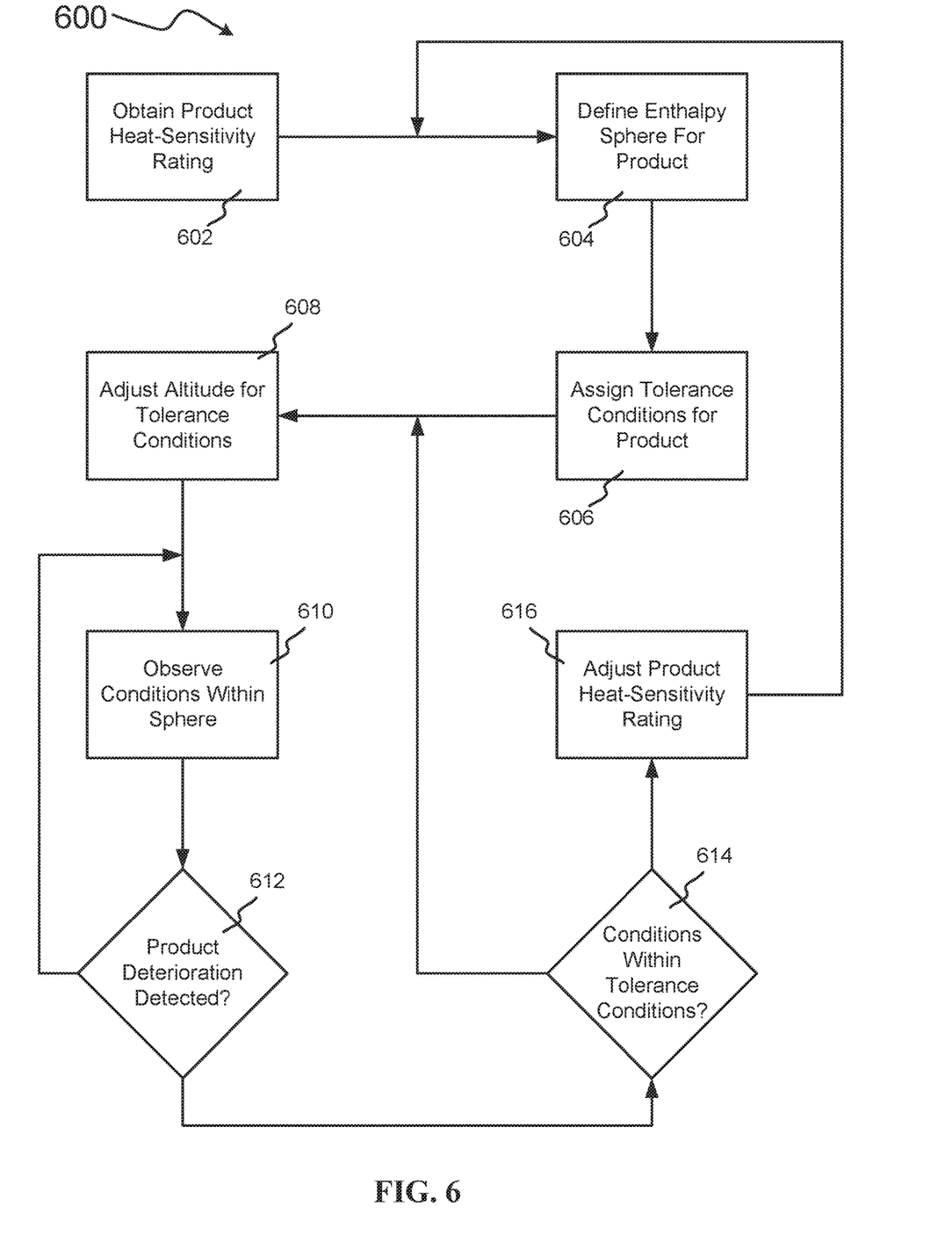
FIG. 6 illustrates an example method in which the heat-sensitivity rating of a product stored in an automated warehouse is adjusted based on the detection of unpredicted deterioration.

FIG. 6 illustrates an example method 600 in which the heat-sensitivity rating of a product stored in an automated warehouse is adjusted based on the detection of unpredicted deterioration. In block 602, a heat-sensitivity rating for the product is obtained. This heat-sensitivity rating may be obtained in any method consistent with the embodiments of this disclosure. In block 604 the enthalpy sphere for the product is defined based on the sensitivity rating, consistent with the embodiments of this disclosure.

Once an enthalpy sphere is defined, tolerance conditions for the product are assigned in block 606 based, at least in part, on the heat-sensitivity rating. For example, in some embodiments a maximum temperature may be assigned to a product based on the heat sensitivity rating, as well as a maximum amount of time that the product may be below a second temperature that is below the maximum temperature. In block 608, the altitude of the automated warehouse may be adjusted based on those tolerance conditions. In some embodiments, this may include forecasting temperatures during a future time period at the warehouse's a current altitude and predicting whether the product is likely to experience deterioration at those temperatures. In those embodiments, if deterioration is not predicted, the altitude may not be adjusted. However, if deterioration is predicted, the altitude of the warehouse may be adjusted such that the conditions inside the warehouse align with the product's tolerance conditions.

In some embodiments, adjusting the altitude in accordance with the product's tolerance conditions may include increasing or decreasing the altitude of an airborne warehouse to take advantage of the air temperatures at the increased or decreased altitudes. In other embodiments, adjusting the altitude in accordance with the product's tolerance conditions may include increasing or decreasing the altitude of a submarine warehouse in the water (i.e., the depth of the submarine warehouse) to take advantage of the higher or lower water pressures at the increased or decreased altitudes.

Once the warehouse is located at an altitude that is forecasted to maintain the tolerance conditions in the warehouse, product-monitoring system or systems within the warehouse observe the conditions within the enthalpy sphere in block 610. Specifically, the product may be monitored for signs of deterioration. Product deterioration may include, in some embodiments, signs of dehydration (e.g., wilting), signs of phase changes (e.g., melting, freezing, sublimating), color changes, signs of ripening, and others. The product-monitoring system determines in block 612 whether product deterioration is detected. If product deterioration is not detected, the product-monitoring system continues to monitor conditions within the enthalpy sphere in block 610.

If the product-monitoring system does detect deterioration in block 612, an environmental-monitoring system or systems within the warehouse (which, in some embodiments, may be the same as the product-monitoring system or systems) determine in block 614 whether conditions within the warehouse are still within tolerance conditions for the product. If the environmental-monitoring system determines in block 614 that conditions within the warehouse are no longer within tolerance conditions, the warehouse adjusts the altitude of the warehouse in block 608 to bring the conditions of the warehouse to within the tolerance conditions for the product.

If, however, the environmental-monitoring system determines in block 614 that the conditions within the warehouse are still within the tolerance conditions for the product, and yet the product deteriorated within those conditions, it implies that the tolerance conditions are not correct for the product. Because those tolerance conditions were based on the heat-sensitivity rating obtained in block 602, the heat-sensitivity rating is then adjusted in block 616 to account for the unpredicted deterioration. After the heat-sensitivity rating is adjusted, the enthalpy sphere is defined based on the new heat-sensitivity rating in block 604. In some embodiments, method 600 may be repeated continuously while a product is stored in a warehouse. In those embodiments, this may continuously refine the heat-sensitivity rating of the product, increasing the ability of the warehouse to store that product and similar products for extended periods of time.

Figure 7:
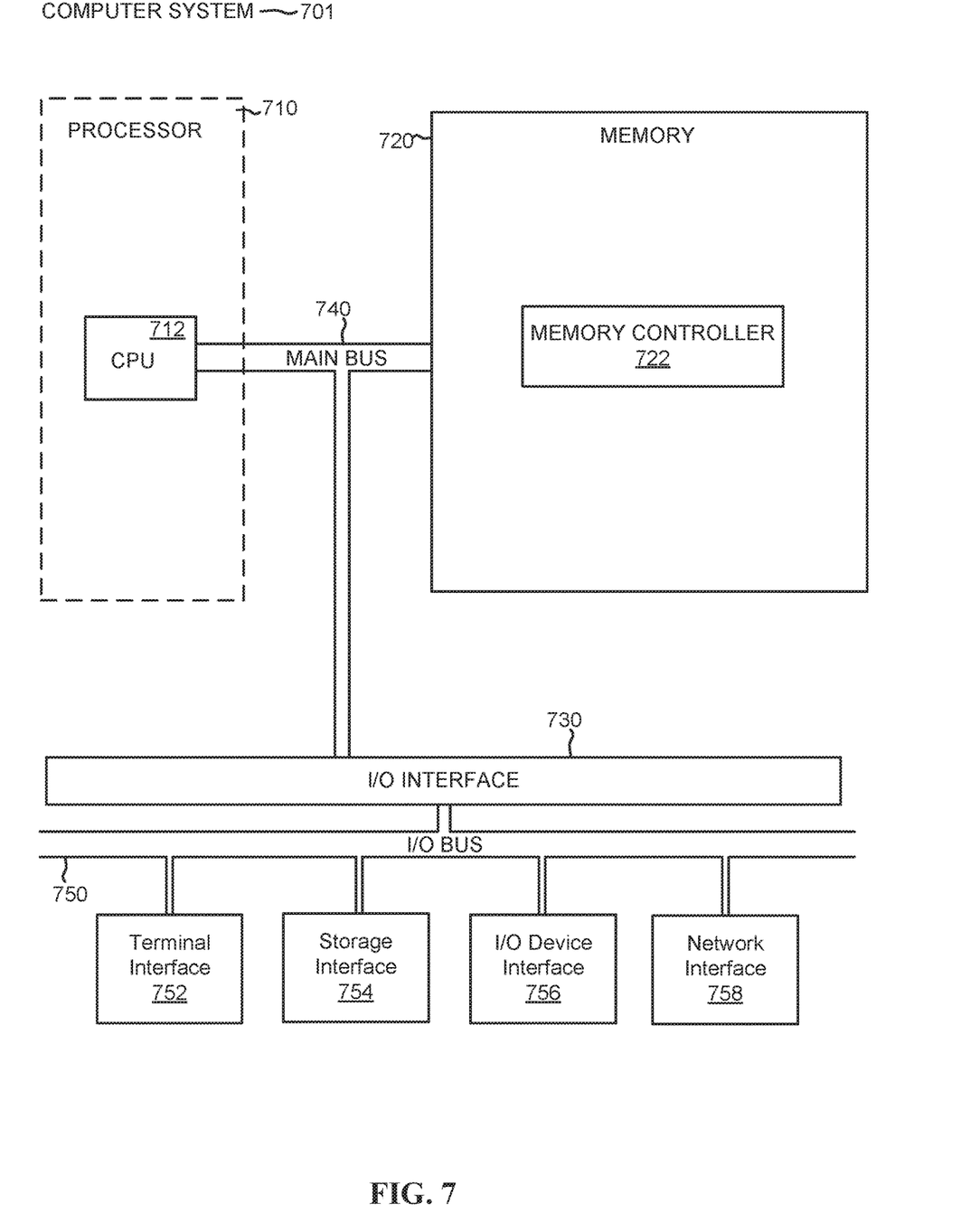
FIG. 7 depicts the representative major components of a computer system that may be used in accordance with embodiments.

FIG. 7 depicts the representative major components of an exemplary Computer System 701 that may be used in accordance with embodiments of the present disclosure. The particular components depicted are presented for the purpose of example only and are not necessarily the only such variations. The Computer System 701 may comprise a Processor 710, Memory 720, an Input/Output Interface (also referred to herein as I/O or I/O Interface) 730, and a Main Bus 740. The Main Bus 740 may provide communication pathways for the other components of the Computer System 701. In some embodiments, the Main Bus 740 may connect to other components such as a specialized digital signal processor (not depicted).

The Processor 710 of the Computer System 701 may be comprised of one or more CPUs 712. The Processor 710 may additionally be comprised of one or more memory buffers or caches (not depicted) that provide temporary storage of instructions and data for the CPU 712. The CPU 712 may perform instructions on input provided from the caches or from the Memory 720 and output the result to caches or the Memory 720. The CPU 712 may be comprised of one or more circuits configured to perform one or methods consistent with embodiments of the present disclosure. In some embodiments, the Computer System 701 may contain multiple Processors 710 typical of a relatively large system. In other embodiments, however, the Computer System 701 may be a single processor with a singular CPU 712.

The Memory 720 of the Computer System 701 may be comprised of a Memory Controller 722 and one or more memory modules for temporarily or permanently storing data (not depicted). In some embodiments, the Memory 720 may comprise a random-access semiconductor memory, storage device, or storage medium (either volatile or non-volatile) for storing data and programs. The Memory Controller 722 may communicate with the Processor 710, facilitating storage and retrieval of information in the memory modules. The Memory Controller 722 may communicate with the I/O Interface 730, facilitating storage and retrieval of input or output in the memory modules. In some embodiments, the memory modules may be dual in-line memory modules.

The I/O Interface 730 may comprise an I/O Bus 750, a Terminal Interface 752, a Storage Interface 754, an I/O Device Interface 756, and a Network Interface 758. The I/O Interface 730 may connect the Main Bus 740 to the I/O Bus 750. The I/O Interface 730 may direct instructions and data from the Processor 710 and Memory 720 to the various interfaces of the I/O Bus 750. The I/O Interface 730 may also direct instructions and data from the various interfaces of the I/O Bus 750 to the Processor 710 and Memory 720. The various interfaces may comprise the Terminal Interface 752, the Storage Interface 754, the I/O Device Interface 756, and the Network Interface 758. In some embodiments, the various interfaces may comprise a subset of the aforementioned interfaces (e.g., an embedded computer system in an industrial application may not include the Terminal Interface 752 and the Storage Interface 754).

Logic modules throughout the Computer System 701— including but not limited to the Memory 720, the Processor 710, and the I/O Interface 730—may communicate failures and changes to one or more components to a hypervisor or operating system (not depicted). The hypervisor or the operating system may allocate the various resources available in the Computer System 701 and track the location of data in Memory 720 and of processes assigned to various CPUs 712. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
storing a product in a protective container, wherein the protective container is surrounded with a fluid;
obtaining a heat-sensitivity rating for the product;
calculating a product energy for the product, the calculating comprising:
identifying a longest dimension of the product;
adjusting the longest dimension based on the heat-sensitivity rating for the product, resulting in an adjusted product dimension;
defining a sphere of enthalpy around the product, wherein the sphere of enthalpy has a radius equal to the adjusted product dimension and is centered at the center of the product;
calculating a volume of the sphere of enthalpy; and
multiplying the volume by the air pressure inside the protective container;
forecasting an environmental condition within the sphere of enthalpy during a first time period;
determining, based on the product energy and the heat-sensitivity rating, that the product is likely to deteriorate during the first time period due to the forecasted environmental condition; and
altering the altitude of the protective container to mitigate the deterioration due to the forecasted environmental condition.

2. The method of claim 1, wherein the fluid is air and the protective container is an automated airborne warehouse.

3. The method of claim 2, wherein altering the altitude comprises ascending to a higher altitude.

4. The method of claim 1, wherein the fluid is water and the protective container is an automated submarine warehouse.

5. The method of claim 4, wherein altering the altitude comprises descending to a lower depth in the water.

6. The method of claim 5, further comprising releasing an amount of pressurized air into the submarine warehouse, wherein the amount is sufficient to cause the air pressure within the submarine warehouse to equal the water pressure at the lower depth.

7. The method of claim 1, wherein the environmental condition is an air temperature.

8. An automated warehouse, the automated warehouse comprising:
a first product-monitoring system configured to:
obtain a heat-sensitivity rating for a product;
assign a tolerance condition to the product based on the heat-sensitivity rating; and
calculate a product energy for the product, the calculating comprising:
identifying a longest dimension of the product;
adjusting the longest dimension based on the heat-sensitivity rating for the product, resulting in an adjusted product dimension;
defining a sphere of enthalpy around the product, wherein the sphere of enthalpy has a radius equal to the adjusted product dimension and is centered at the center of the product;
calculating a volume of the sphere of enthalpy; and
multiplying the volume by the air pressure inside the protective container;
a lift mechanism configured to adjust the altitude of the warehouse to comply with the tolerance condition;
a first sensor configured to detect deterioration of the product;
a second sensor configured to determine, based on the detecting, that a current condition of the warehouse complies with the tolerance condition; and
wherein the first product-monitoring system adjusts, based on the detecting and the determining, the head sensitivity rating for the product.

9. The automated warehouse of claim 8, wherein the heat-sensitivity rating comprises a number greater than zero and less than or equal to one.

10. The automated warehouse claim 8, wherein the first sensor is a digital camera.

11. The automated warehouse of claim 8, wherein the second sensor is a thermometer.

12. An automated submarine warehouse, the automated submarine warehouse comprising:
a flexible hull;
a stored product;
a product sensor configured to:
detect deterioration of the stored product;
calculate a product energy for the product, the calculating comprising:
identifying a longest dimension of the product;
adjusting the longest dimension based on the heat-sensitivity rating for the product, resulting in an adjusted product dimension;
defining a sphere of enthalpy around the product, wherein the sphere of enthalpy has a radius equal to the adjusted product dimension and is centered at the center of the product;
calculating a volume of the sphere of enthalpy; and
multiplying the volume by the air pressure inside the protective container; and
determine, based on the type of deterioration detected, the likely cause of the detected deterioration, wherein the determining is based on the product energy for the product;
a pressure tank configured to increase an air pressure of the submarine warehouse in response to the product sensor determining that the likely cause is a temperature below a tolerance condition for the product is measured; and
a ballast mechanism configured to cause the warehouse to descend to a first depth at which a first water pressure equals the increased air pressure of the submarine warehouse.

13. The submarine warehouse of claim 12, wherein the submarine warehouse further comprises:
a valve configured to decrease air pressure of the submarine warehouse in response to the product sensor determining that the likely cause is a temperature about a tolerance condition for the product is measured;
wherein the ballast mechanism is further configured to cause the warehouse to ascend to a second depth at which a second water pressure equals the decreased air pressure of the submarine warehouse.

* * * * *